United States Patent [19]
Knight et al.

[11] Patent Number: 5,559,282
[45] Date of Patent: Sep. 24, 1996

[54] METHOD AND APPARATUS FOR TESTING THE EFFECTIVENESS OF AN AIR BARRIER INSTALLATION

[75] Inventors: Kevin D. Knight, Grosse Isle; Graham A. Knight; Colin D. Knight, both of Winnipeg, all of Canada

[73] Assignee: Retro-Specs Ltd., Winnipeg, Canada

[21] Appl. No.: 437,072

[22] Filed: May 5, 1995

Related U.S. Application Data

[63] Continuation-in-part of Ser. No. 260,319, Jun. 15, 1994.

[30] Foreign Application Priority Data

Jun. 8, 1994 [CA] Canada ................................... 2125420

[51] Int. Cl.⁶ .............................. G01M 3/04; G01M 3/26
[52] U.S. Cl. ........................................................ 73/40; 73/38
[58] Field of Search ........................................... 73/40, 38

[56] References Cited

U.S. PATENT DOCUMENTS

| | | | |
|---|---|---|---|
| 3,326,035 | 6/1967 | Hirota | 73/40 |
| 3,524,342 | 8/1970 | Hobbs | 73/40 |
| 3,664,965 | 5/1972 | Hirota et al. | 252/408 |
| 3,811,317 | 5/1974 | Leonard et al. | 73/40 |
| 3,872,712 | 3/1975 | Westervelt et al. | 73/40 |
| 3,937,064 | 2/1976 | Wolf, Jr. et al. | 73/40 |
| 4,002,055 | 1/1977 | Kops | 73/40 |
| 4,104,905 | 8/1978 | Zachary | 73/40 |
| 4,363,236 | 12/1982 | Meyers | 73/40 |
| 4,449,393 | 5/1984 | Tucker et al. | 73/40 |
| 4,467,635 | 8/1984 | Dahmén et al. | 73/40.5 R |
| 4,510,791 | 4/1985 | Yuill | 73/40 |
| 4,513,605 | 4/1985 | Hawerkamp | 73/40 |
| 4,517,826 | 5/1985 | Cole et al. | 73/40 |
| 4,534,208 | 8/1985 | Macin et al. | 73/49.3 |
| 4,635,469 | 1/1987 | Modera et al. | 73/40 |
| 4,765,810 | 8/1988 | Wetzel | 55/270 |
| 4,979,390 | 12/1990 | Schupack et al. | 73/38 |
| 5,182,941 | 2/1993 | Frenkel et al. | 73/40 |
| 5,214,957 | 6/1993 | Collins | 73/40 |
| 5,404,747 | 4/1995 | Johnston et al. | 73/40 |

OTHER PUBLICATIONS

Promotional Literature for Masters Leak Detectors (undated) Jan. 1994 Canada Commercial Specifications Advertisement.

*Primary Examiner*—Hezron E. Williams
*Assistant Examiner*—J. David Wiggins
*Attorney, Agent, or Firm*—Barrigar & Moss

[57] ABSTRACT

A method and apparatus for testing the effectiveness of a building air barrier, or part thereof, whereby an identification of any air leakage therethrough is provided. A soap solution (or other solution having a similar bubbling characteristic) is applied to a selected air barrier test area. An open-ended flask is positioned over the test area and a centrifugal (or standard) fan is activated at the head of the flask to create an air pressure differential across the air barrier. In the presence of the air pressure differential the soap solution will bubble if there is an air leakage in the air barrier within the test area and, therefore, the existence or non-existence of bubbles in this area identifies whether or not there is an air leakage (i.e. break) in the air barrier in that area.

17 Claims, 5 Drawing Sheets

METHOD AND APPARATUS FOR TESTING THE EFFECTIVENESS OF AN AIR BARRIER INSTALLATION

RELATED APPLICATION

This application is a continuation-in-part of application Ser. No. 08/260,319 filed Jun. 15, 1994.

FIELD OF THE INVENTION

The invention relates to air barrier systems in buildings and provides a method and apparatus for on site testing of the effectiveness of an air barrier installation, or portion thereof, whether during or after construction of the building, by detecting air leakages across the barrier e.g. at wall ties or the like installed through an air barrier membrane or at discontinuities between different elements of the overall building envelope.

BACKGROUND

The leakage of air through a building envelope (i.e. air exfiltration and infiltration) causes several problems the more serious of which is the condensation of moisture present within the air as it passes through the building structure. The resulting condensation can cause surface staining of walls and ceilings, premature deterioration of the building structure and air leakage will cause an excessive energy loss. Consequently, building construction objectives and Canadian standards now require that effective air barrier systems, which avoid air leakage, be designed and used in the construction of new buildings and the retrofitting of existing buildings. Such standards which apply in Canada, but are not yet generally applied in other countries, are expected to be adopted elsewhere as construction technology advances and other countries recognize the need for such standards.

Where climatic conditions exist it is desirable to include in the design and construction of a building an effective air barrier to control the movement of humidity via air borne vapour in order to avoid any buildup of condensation and frost in the walls and roof. The properties of an effective air barrier are distinct from those of a vapour barrier, the purpose of vapour barriers being to prevent vapour diffusion. Vapour diffusion is determined by the porosity of a material, whereas an air barrier is evaluated by the rate of air leakage through it caused by holes in the air barrier or lack of continuity between different air barrier materials when installed (such as a discontinuity between the roofing membrane and an air barrier membrane). However, it is preferable, if possible, to combine both of these elements in one component. It is to be noted also that certain construction materials which were once deemed to be efficient air barriers between environments, such as concrete walls, are no longer satisfactory to meet current Canadian building requirements for air barriers. Although a perfectly poured test sample of concrete would test satisfactorily as an air barrier, the discontinuities and installation flaws of a poured concrete wall render such a wall unacceptable as an air barrier.

For this reason air barrier membranes are now installed over concrete walls. The term "air barrier" used herein means the building elements (and parts thereof) forming a building envelope which, to meet Canadian standards, must be effective to prevent air leakage therethrough at standardized pressure differential levels across the air barrier. (The term "air barrier" herein is not intended to refer simply to any material which might be effective to block the passage of air therethrough.)

In most commercial structures an air barrier membrane is used, usually made from a modified bituthane or a trowelled on modified bituthane or rubber. Sheet metal liners are also utilized in certain designs. Individually, these components have all been tested for effectiveness when purchased but a leakage problem may arise when these components are installed in a building system at the locations where these are joined to or abut different materials.

The standard location for the air barrier membrane is on the outside of the inside wall on the warm side of the insulation which is covered by the exterior finished facade. Therefore, the membrane is penetrated many times by ties and fastening systems including the insulation fastening system. Other building components such as windows are coupled together by means of the membrane and the junction between the membrane and window must be airtight to ensure that the overall air barrier (i.e. the building envelope) is effective.

Very little air pressure differential is required between the inside and outside environments separated by the building envelope to create an air leakage. The recommendation for allowed maximum leakage rate of building materials is 0.02 L/(s.m$^2$) and for the building system is 0.1 L/(s.m$^2$) at 75 Pa pressure as referenced in the National Building Code of Canada. A suitable testing procedure to test a building air barrier under maximum environmental air pressures would induce a pressure differential across the barrier of approximately 300 Pa in order to provide a test suitable for identifying leaks in the building system. For any structures where higher loads are expected, a maximum range of 1000 Pa to 2000 Pa would be utilized.

Testing systems for testing the effectiveness of air barrier and/or vapour barrier systems have been developed for use in a laboratory or other experimental setting in order to test the effectiveness of certain construction materials. An example of such testing apparatus is disclosed by U.S. Pat. No. 4,979,390 to Schupack et al which provides a vacuum apparatus used to test the porosity of a concrete structure and to identify any air leakages caused by cracks or fissures therein. However, building construction joins and other construction details are not capable of being tested by that apparatus at a building site because the Schupack apparatus is not capable of testing for air barrier continuity at the points of attachment of air barrier membranes (e.g. by means of ties and the like) or at the points of changes from one air barrier material to another. Moreover, the vacuum pressure required by the apparatus of Schupack far exceeds the foregoing air pressure differential levels to which the applicable building standards are directed. Some on-site (i.e. field) testing methods are available which use smoke tracers, infrared scanning techniques, air flow measurement devices, sound detection systems or tracer gas concentration detectors. However, the available on-site testing methods are not suitable for use during the on-going construction of a building and, instead, are intended for use after the completion of the building when corrective action is more difficult.

Therefore, there is a need in the construction industry for a means of testing for air leakages at any time during the construction phase, or in the laboratory, which may be conveniently and easily employed to simulate environmentally realistic conditions of air pressure differential across the air barrier according to accepted building standards. Further, there is a need for such a testing means for use on any type of air barrier whether it be the main building elements such as windows or an air barrier membrane (sheeting), or the various types of joints used in the building such as joints between walls, doors, windows, mechanical louvres, etc., insulation fastening systems, joins and laps in the air barrier sheeting, expansion and compression joints or masonry tie penetrations.

Vacuum testing systems are known for testing material strength and, in the case of U.S. Pat. No. 4,002,055 to Kops, for testing for leaks at seams between synthetic resin sheets. However, such vacuum systems are not suitable for testing building air barriers which cannot be successfully tested on site under vacuum conditions. The Kops apparatus utilizes a dome-shaped enclosure and a vacuum pump to create a very high pressure sufficient to pull overlapping resin sheets upward, at the seam between them, into the dome. Such a test is destructive by nature (since it operates by stressing the material being tested) and is not capable of testing joins between different construction materials on site.

SUMMARY OF THE INVENTION

In accordance with the invention there is provided a method of testing of an air barrier, or part thereof for air leakage, comprising the steps of: (a) applying a soap solution, or other solution having similar bubbling properties to a surface of a selected test area of the air barrier; (b) positioning an open end of a chamber over the test area comprising that surface and sealing the chamber to the bounds of the test area sufficient to permit maintenance of an air pressure differential across the air barrier (c) removing a sufficient amount of air from the chamber to produce a selected air pressure differential, of less than 2000 Pa, across the air barrier and, (d) identifying, whether the soap or other similar solution has bubbled in the presence of the induced air pressure differential. Preferably the chamber is transparent. The soap or other similar solution may comprise a compound to increase the longevity of the bubbles and/or an anti-freeze compound. Also in accordance with the invention there is provided an air barrier testing apparatus comprising an open-ended chamber configured to have its open end fitted over a selected test area of the air barrier, means for sealing the chamber to the bounds of the selected air barrier test area when the chamber is positioned over the test area, the sealing means being suitable to permit maintenance of an air pressure differential across the air barrier and configured to press fit against the surface of the test area along the bounds of the air barrier test area and means for removing air from the chamber such as, but not limited to, rotating fan means, when the chamber is positioned and sealed over the air barrier test area to produce a selected air pressure differential of less than 2000 Pa across the air barrier.

Preferably means is provided for measuring the air pressure differential across the air barrier when the chamber is positioned and sealed over the air barrier test area and means for indicating to the user of the apparatus the fact that the air pressure differential has reached a selected level. Preferably the means for removing air also comprises means for varying the speed of the fan to compensate for air leakage from the chamber and permit maintenance of a selected air pressure differential level.

DETAILED DESCRIPTION OF A PREFERRED EMBODIMENT

Figure 1A:
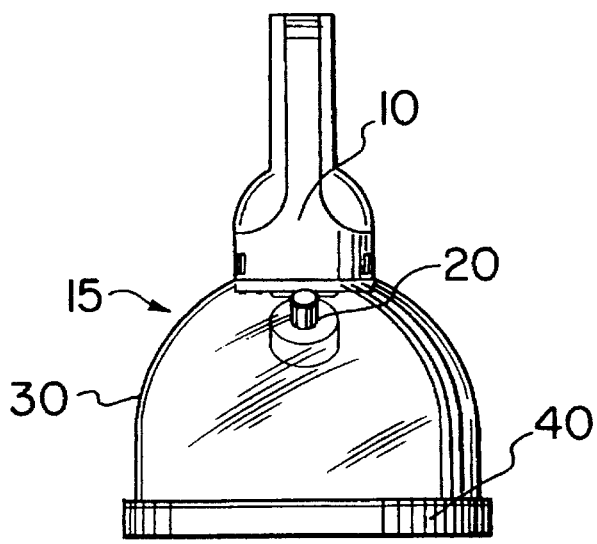
FIG. 1 is a three-view orthographic drawing showing the top (FIG. 1(a)), front (FIG. 1(b)) and right side (FIG. 1(c)) views of an embodiment of the invention.
Figure 1B:
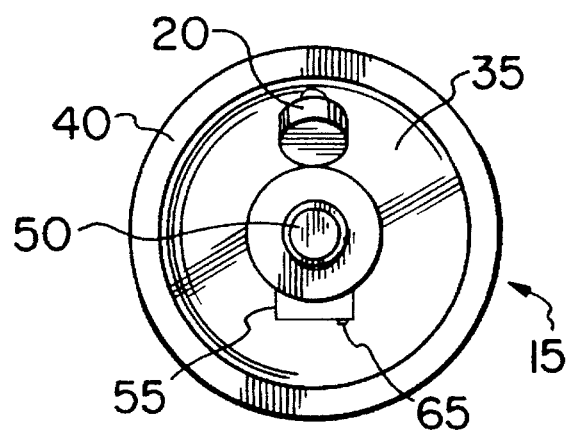
Figure 1C:
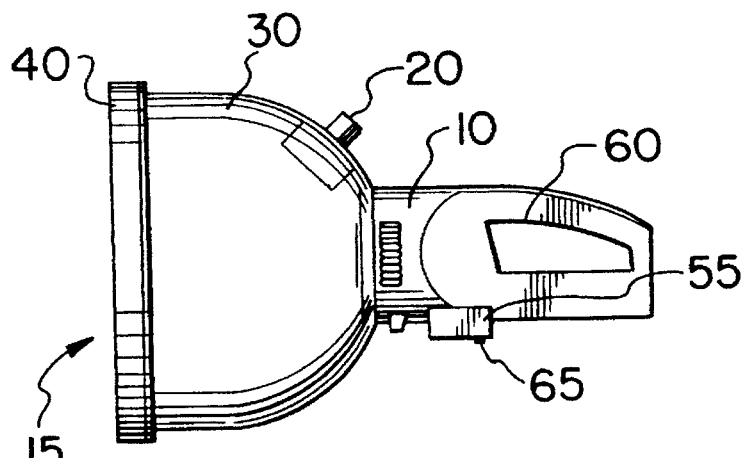
Figure 2:
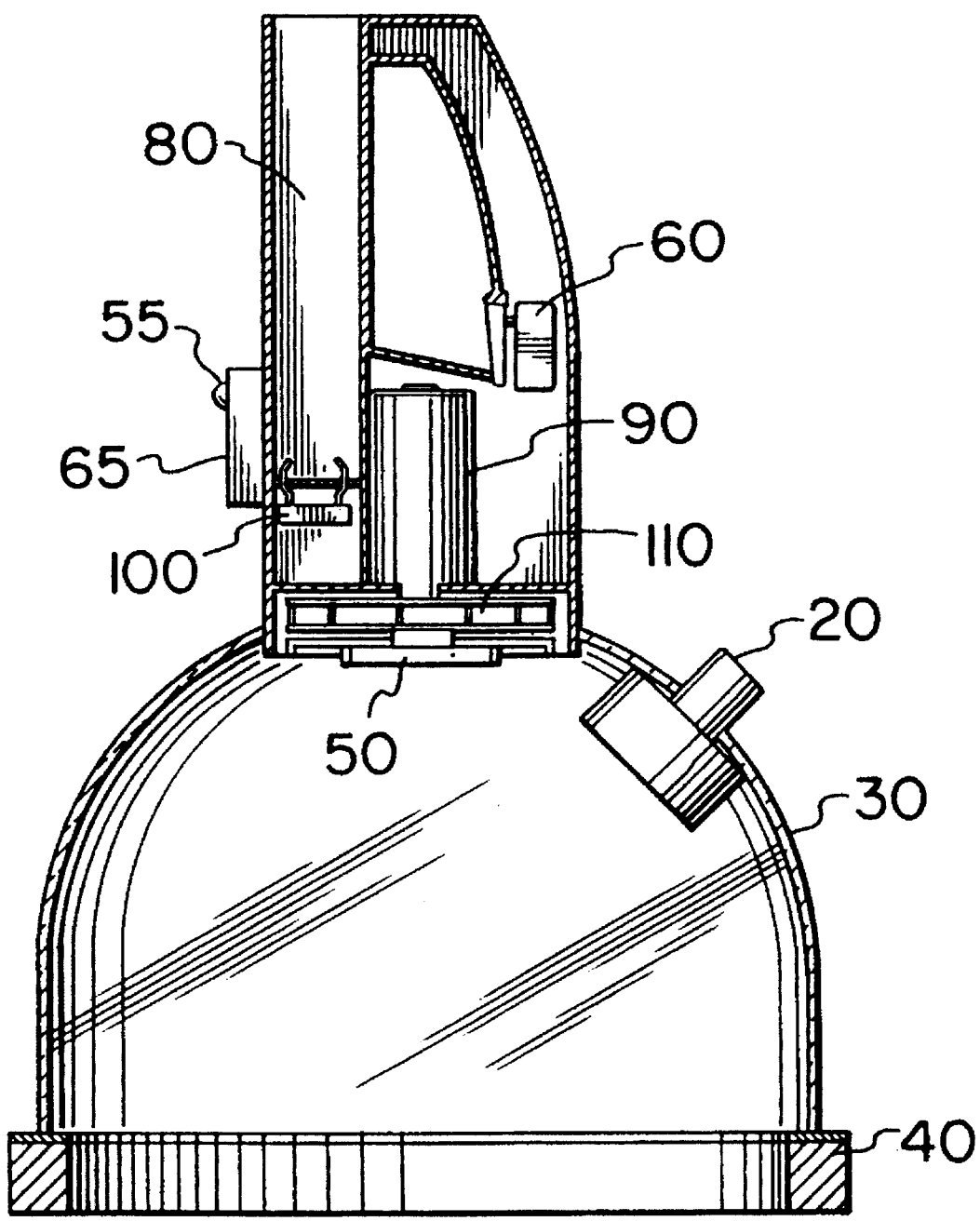
FIG. 2 is a longitudinal cross-section of the embodiment of FIG. 1.
Figure 3:
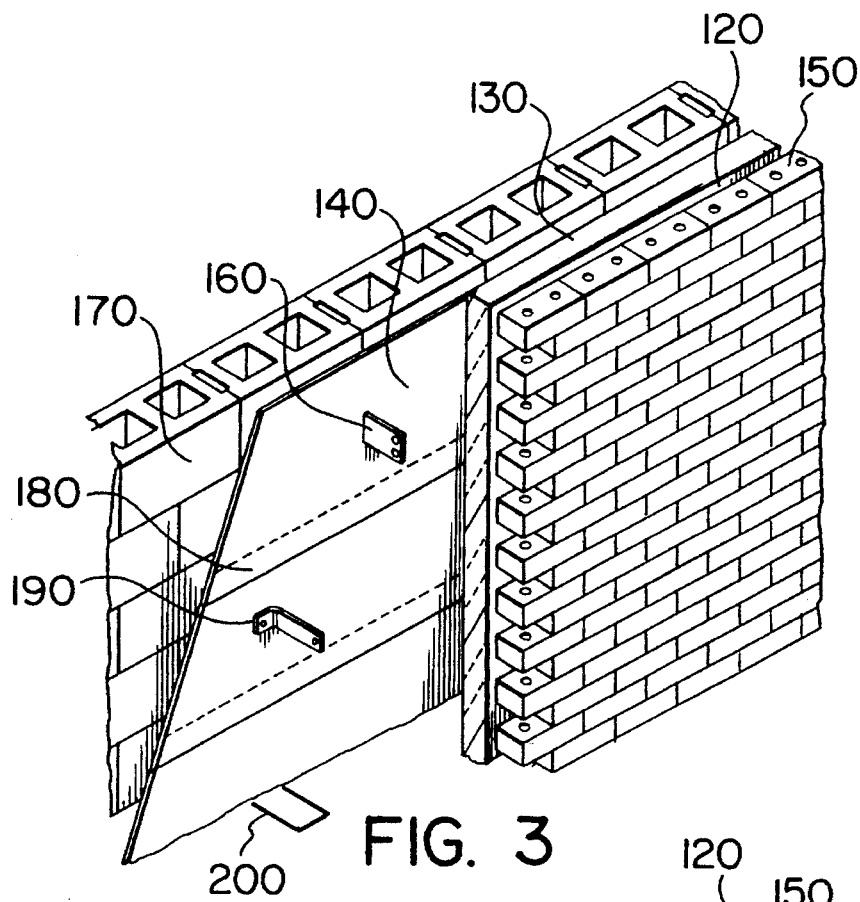
FIG. 3 is an isometric drawing showing an outside masonry wall construction and the typical protrusions through an air barrier thereon.
Figure 4:
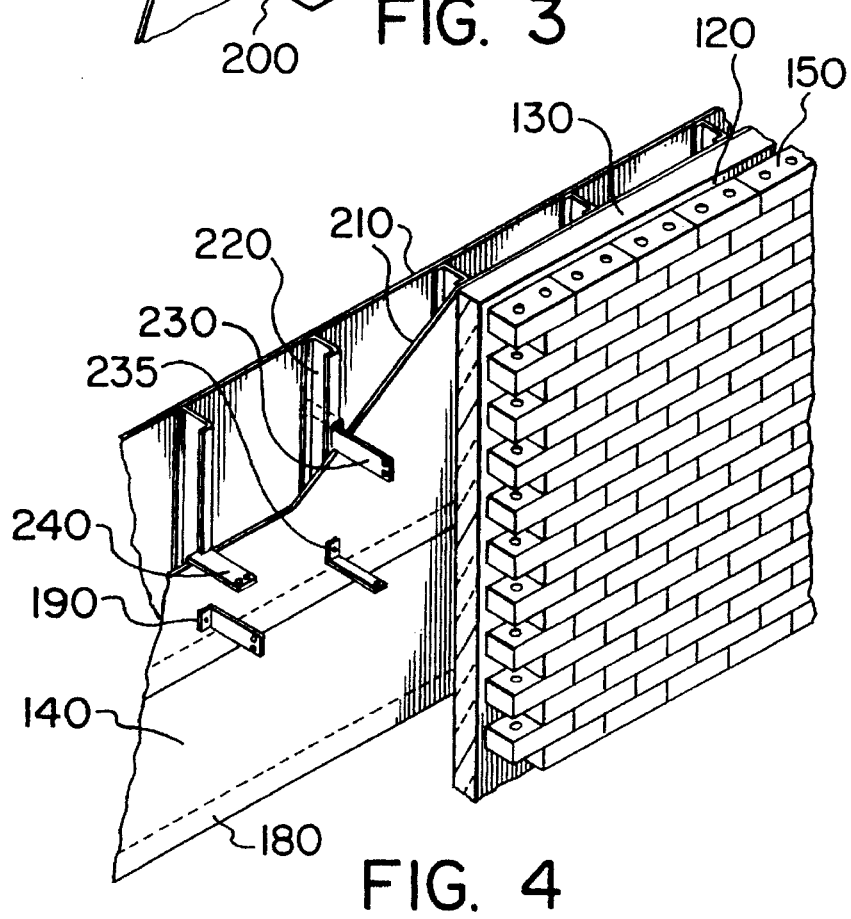
FIG. 4 is an isometric drawing showing an outside steel stud wall construction and the typical protrusions through an air barrier thereon.
Figure 5:
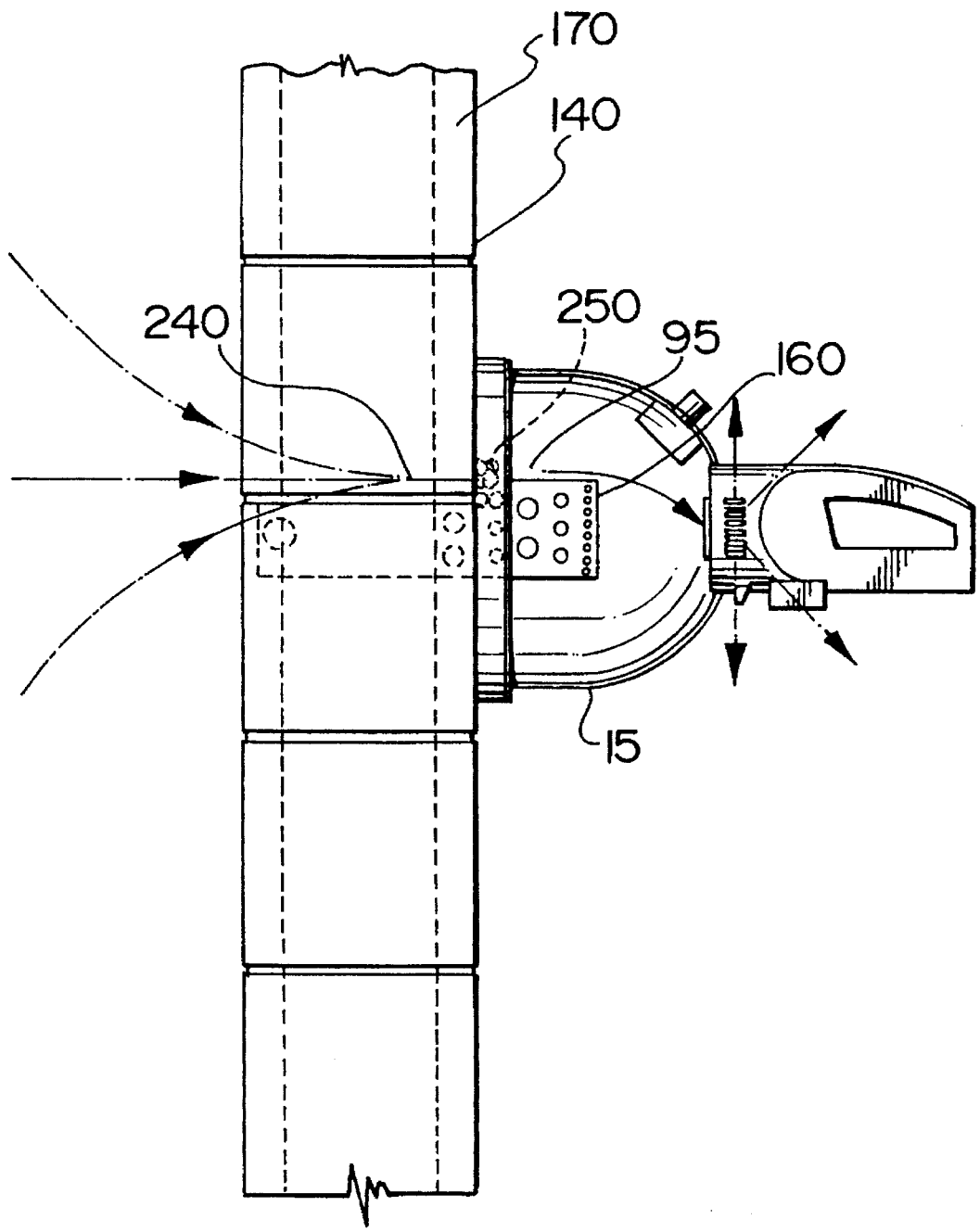
FIG. 5 is a plan view of part of an outside masonry wall showing an embodiment of the invention as shown in FIGS. 1 and 2 in use to test for air leakage of an air barrier around a shear tie.
Figure 6:
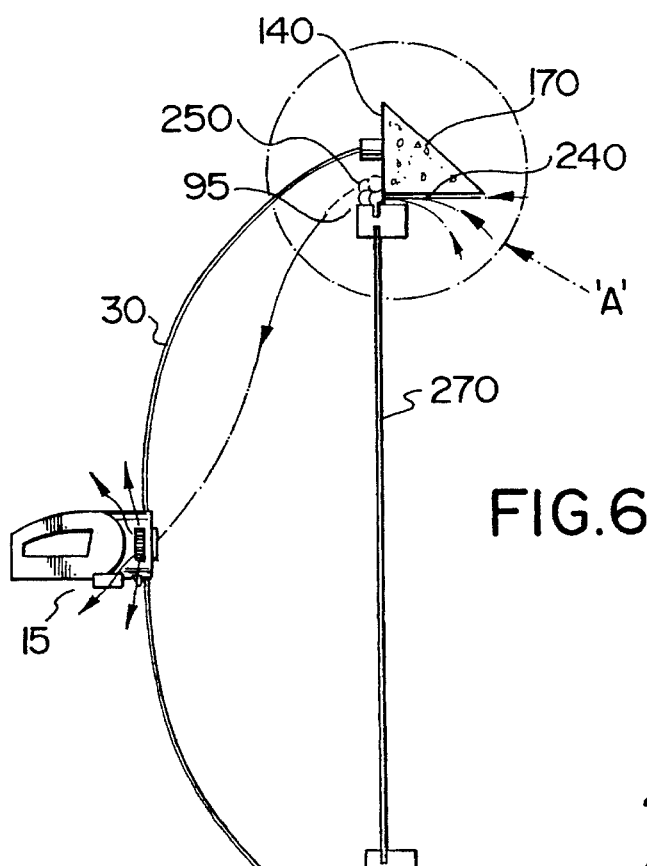
FIG. 6 is a plan view of an outside wall section containing a window unit showing an embodiment of the invention in use to test for air leakage of an air barrier provided by an installed window.

The testing apparatus 15 of the invention is illustrated by FIGS. 1 and 2 of the drawings and is used to test for any air leakage in a test area 95 of the air barrier 140 (see FIGS. 5 and 6). As shown by FIGS. 3 and 4, an outside wall construction includes, from the outside to the inner back-up wall, an outer cladding 150 such as face brick, an air space 120, insulation 130, an air barrier 140 and the back-up wall 170 which may be masonry blocks for masonry wall construction (per FIG. 3) or dry wall 210 and studs 220 for stud wall construction (per FIG. 4). The air barrier to be tested may be sheeting 140 as shown in the drawings or any air barrier material the effectiveness of which, to withstand air leakage, is desired to be tested. A potential for air leakage in the air barrier 140 exists at protrusions through the air barrier such as at vertical surface mounted ties 190, wall shear ties 160, horizontal surface mounted ties 235, wall ladder ties 200, vertical clipped on ties 230 and horizontal clipped on ties 240. Lap joints 180 of the air barrier also present points of potential air leakage.

According to the inventor's present method of testing for air leakage a soap solution is applied to the test area 95 of the air barrier 140 which is desired to be tested. The soap solution may be a simple solution of ordinary dish soap in water, for example, or any other solution having similar bubbling properties; the essential feature of the required solution being a noticeable change in appearance, by bubbling or visible distension, when an air flow tries to pass through the solution. For the testing illustrated by FIGS. 5–7 the soap solution is applied, for example by spraying or brushing the solution, on and around the chosen test area 95.

If desired for the specific application the soap solution may include additives to increase the visibility of the bubbles by changing their reflectivity or some other selected characteristic. The solution may also include an antifreeze compound such as glycol to prevent freezing of the solution in cold weather conditions. A compound such as dibromostearate to increase bubble longevity may also be included in the solution.

The elements of the preferred testing apparatus 15 are shown by FIGS. 1 and 2. The apparatus 15 includes a protective casing 10, an open-ended transparent chamber 30 which can be of various shapes and sizes and a flexible air seal 40. A centrifugal fan 110 driven by a direct current electrical motor 90 is provided to induce airflow through a filter 50. The batteries providing the electrical power are contained in a battery chamber 90 and contact battery contacts 100. The apparatus is operated by a variable speed electrical trigger mechanism 60. An electrical pressure differential switch 55 measures the pressure differential between the inside 35 of the chamber 30 and the ambient air pressure and operates an indicator light 65 when the pressure differential has reached the desired level. A light 20 operates in conjunction with the trigger mechanism 60 to illuminate the test area to be covered by the chamber 30. The light may be other than conventional white light, if desired, to increase the visibility of the bubbles.

Figure 7:
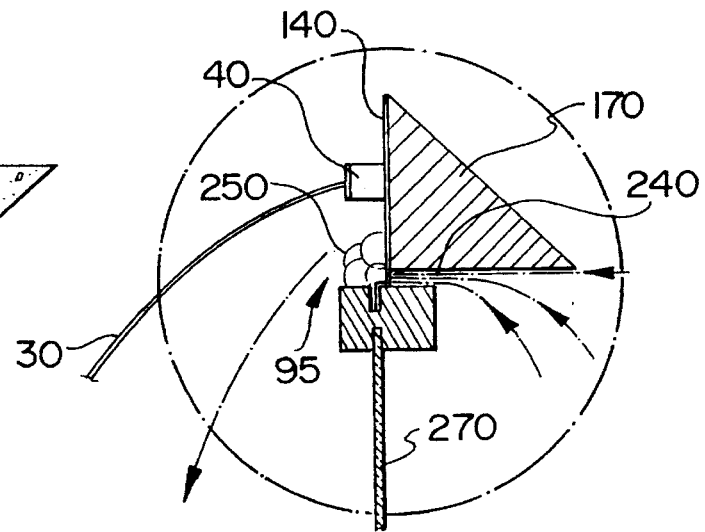
FIG. 7 is an enlarged view of the edge of the window unit (Detail A) of FIG. 6.

FIGS. 5–7 show the use of the test apparatus 15 to test a test area 95 for air leakage. FIG. 5 shows the test apparatus 15 being used on a test area 95 around a through wall shear tie 160. FIGS. 6 and 7 show the testing apparatus 15 being used on a typical window unit 270. A bubbling solution as described above is applied to the test area on the surface of the air barrier 140 which is to be encased by the chamber 30. The open end of the chamber is placed against the air barrier 140 so as to completely enclose whereby the seal 40 is press fit against the bounds of the test area. When the test apparatus is operated by activating the fan 110 it removes air from the chamber and thereby induces a pressure differential across the air barrier 140 as a result of the greater pressure outside the chamber than inside. The air seal 40 need not provide a perfect seal between the air barrier 15 and the chamber 30 because a vacuum is not required to be induced in the chamber. Rather, for the relatively low air pressure differential range required the variable speed trigger 60, which controls the speed of the motor 90 and the centrifugal fan 110, adjusts the pressure differential induced by the apparatus and compensates for any air leakage through the air barrier 140 and/or around the air seal 40. The indicator light 65 goes on when the pressure differential is at the desired level. The desired pressure differential range depends on many factors such as the type and dimensions of the building and the average wind speed and air temperature to be expected at the building location of the test site. The air pressure differential required is generally in the range of 75 Pa ($10.9 \times 10^{-3}$ PSI) to 2000 Pa ($290 \times 10^{-3}$ PSI). If a leak is present in the air barrier, the pressure differential created by the testing apparatus 15 will cause an airflow 240 through the openings in the air barrier 140 and this results in a visible bubbling 250 of the solution. Therefore, the presence of bubbles 250 indicates the presence of a leak in the air barrier 140, while the absence of bubbles 250 indicates that the air barrier 140 is air tight at the selected testing pressure differential.

The size and shape of the chamber 30 may be configured to match the intended test area 95. As shown by FIG. 6 the chamber 30 may be dome-shaped for use over a flat-surfaced test area such as the window unit 270 illustrated.

For some applications it may be suitable that the chamber 40 be held in place by hand and in others, such as for testing installed windows, it may be preferable that the chamber 40 be mechanically fastened to the wall.

The presentation of the foregoing details of the preferred embodiments developed by the inventors is not intended to limit the scope of the present invention and departures therefrom may be made without departing from the scope of the invention which is defined by the appended claims.

What is claimed is:

1. A method of testing a selected test area of an air barrier forming part of a building construction for air leakage through said air barrier, whereby said method permits said testing of said test area to be conducted on site during construction of the building and in isolation of other areas of said construction, said method comprising the steps of:

(a) applying a soap solution, or other solution having similar bubbling properties, to a surface of said selected test area;

(b) positioning an open end of a chamber over said test area comprising said surface and fitting said chamber to the bounds of said test area in a sufficiently air-tight manner to permit maintenance of an air pressure differential across said air barrier in said test area;

(c) removing a sufficient amount of air from said chamber to produce a selected air pressure differential, of less than approximately 2000 Pa, across said air barrier in said test area; and, (d) identifying whether said soap or other similar solution has bubbled, foamed or become otherwise visibly distended at the location of said test area while in the presence of said air pressure differential.

2. A method according to claim 1 whereby said chamber is transparent.

3. A method according to claim 2 whereby said soap or other similar solution comprises a surface active or gelling compound to increase the longevity of the bubbles produced by said solution.

4. A method according to claim 2 whereby said soap or other similar solution comprises an antifreeze compound.

5. Air barrier testing apparatus for testing a selected test area of an air barrier forming part of a building construction for air leakage through said air barrier, said apparatus being useful for testing said test area on site during construction of the building and in isolation of other areas of said construction said apparatus comprising:

(a) an open-ended chamber configured to have its open end fitted over said test area;

(b) means for fitting said open-end of said chamber to the bounds of said test area when said chamber is positioned thereover, said fitting means permitting engagement between said chamber and said bounds of said test area in a sufficiently air-tight manner to permit maintenance of an air pressure differential across said air barrier in said test area and configured to press-fit against the surface of said test area at said bounds and (c) means for removing air from said chamber when said chamber is positioned and fitted over said test area to produce a selected air pressure differential of less than approximately 2000 Pa across said air barrier in said test area.

6. Air barrier testing apparatus according to claim 5 wherein said chamber is transparent.

7. Air barrier testing apparatus according to claim 6 wherein said means for removing air comprises a centrifugal fan.

8. Air barrier testing apparatus according to claim 7 comprising means for measuring the air pressure differential across said air barrier in said test area when said chamber is positioned and fitted over said air barrier test area in said sufficiently air-tight manner and means for indicating to the user of said apparatus the fact that said air pressure differential has reached a selected level.

9. Air barrier testing apparatus according to claim 8 wherein said means for removing air comprises means for varying the speed of said fan to compensate for air leakage from said chamber and permit maintenance of a selected air pressure differential level.

10. The combination of an air barrier testing apparatus according to claim 6 and a soap solution, or other suitable solution having similar bubbling properties, for application to a surface of said test area.

11. A combination according to claim 10 wherein said soap or other suitable solution comprises a surface active or gelling compound to increase the longevity of the bubbles produced by said solution.

12. A combination according to claim 10 wherein said soap or other suitable solution comprises an anti-freeze compound.

13. A combination according to claim 10 wherein said soap or other suitable solution comprises an additive to change the optical reflectivity of the bubbles produced by said solution to improve the visibility of said bubbles.

14. The combination of an air barrier testing apparatus according to claim 9 and a soap solution, or other suitable solution having similar bubbling properties, for application to a surface of said test area.

15. A combination according to claim 14 wherein said soap or other suitable solution comprises a surface active or gelling compound to increase the longevity of the bubbles produced by said solution.

16. A combination according to claim 14 wherein said soap or other suitable solution comprises an anti-freeze compound.

17. A combination according to claim 14 wherein said soap or other suitable solution comprises an additive to change the optical reflectivity of the bubbles produced by said solution to improve the visibility of said bubbles.

\* \* \* \* \*